Nov. 21, 1944. A. MANNING ET AL 2,363,256
HOLDER FOR CONTAINERS
Filed Oct. 5, 1942

INVENTORS
ALBERT MANNING
ANDREW ONUSKA
BY
Oscar A. Geier
ATTORNEY

Patented Nov. 21, 1944

2,363,256

UNITED STATES PATENT OFFICE 2,363,256

HOLDER FOR CONTAINERS

Albert Manning and Andrew Onuska,
North Arlington, N. J.

Application October 5, 1942, Serial No. 460,824

1 Claim. (Cl. 220—15)

This invention relates to holders for containers.

Ice cream containers which are located in drug stores and the like, consist usually of a plurality of elongated cylindrical bodies which are located one next to the other, each container being used for the ice cream of one flavor. The attendant dispenses ice cream from these containers by means of a spoon or scoop.

It was found that the outer surfaces of these containers are often covered with moisture and are very slippery. An attendant who desires to remove some of the ice cream with his scoop will turn or rotate these containers. This rotation impedes his work and slows up the dispensing of the ice cream to a considerable extent.

An object of the present invention is to eliminate this sliding, turning or rotary motion of ice cream containers and the like, by the use of a holder specially constructed for this purpose.

Another object is the provision of a holder for cylindrical containers or the like, which is inexpensive to manufacture and easy to operate and which effectively prevents the turning of containers while their contents are being dispensed.

Other objects of the present invention will become apparent in the course of the following specification.

In accomplishing the objects of the present invention, it was found desirable to provide one or more springs or other resilient elements which elastically or yieldably engage a cylindrical side surface of a container and the ends of which are mounted upon two separate arms or frame-like elements which are pivotally connected to each other and which may swing toward or away from each other.

The invention will appear more clearly from the following detailed description when taken in connection with the accompanying drawing showing, by way of example, a preferred embodiment of the idea.

Figure 1:
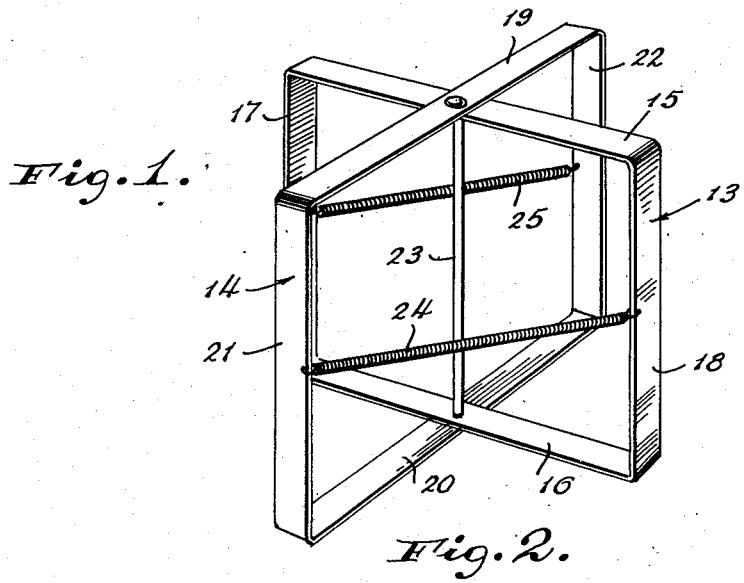
Figure 1 is a perspective view of a container holder constructed in accordance with the principles of the present invention.

The drawing shows two cylindrical containers 4 and 5 which may be used for dispensing ice cream or the like and which are located one next to the other within a counter 6. The counter 6 has side walls 7 and a top 8 provided with two openings 9 and 10 situated above the containers 4 and 5, respectively. The openings 9 and 10 may be closed by covers 11 and 12, respectively.

An attendant dispenses ice cream by raising one of the covers and inserting his scoop (not shown) through one of the openings 9 or 10 into the interior of a container situated directly below the opening.

The container would usually turn or rotate while ice cream is being scooped out, thereby impeding the work of the attendant and causing a waste of time and energy.

In accordance with the present invention, this turning of the containers 4 and 5 is avoided by a container holder which is shown separately in Figure 1 of the drawing and which comprises two rectangular frames 13 and 14.

The frame 13 includes an upper transverse element 15, a lower transverse element 16, and vertical elements 17 and 18 joining the elements 15 and 16.

The frame 14 is similar in form to the frame 13 and comprises transverse elements 19 and 20 joined by vertical elements 21 and 22.

The two frames 13 and 14 are joined to each other by an elongated pivot 23, the upper end of which extends through the transverse elements 15 and 19 intermediate their ends. The lower end of the pivot 23 extends through the middle of the transverse elements 16 and 20. The projecting ends of the pivot 23 are riveted over to prevent the pivot from falling out.

The resilient and elastic members engaging the side walls of the containers consist of two springs 24 and 25.

Each of the springs 24 and 25 has the form of an elongated coil spring, the two ends of which are firmly attached to adjacent vertical elements of two different frames. For instance, the spring 24 has one end connected to the vertical element 18 of the frame 13, while its other end is connected to the vertical element 21 of the frame 14. Similarly, one end of the spring 25 is connected to the vertical element 17 of the frame 13, while its other end is connected to the vertical element 22 of the frame 14. The springs are preferably located at the same level substantially in the middle of the frame.

Obviously, the arrangement or the number of the springs may be changed at will, and the springs may be replaced by elastic straps or the like.

Figure 2:
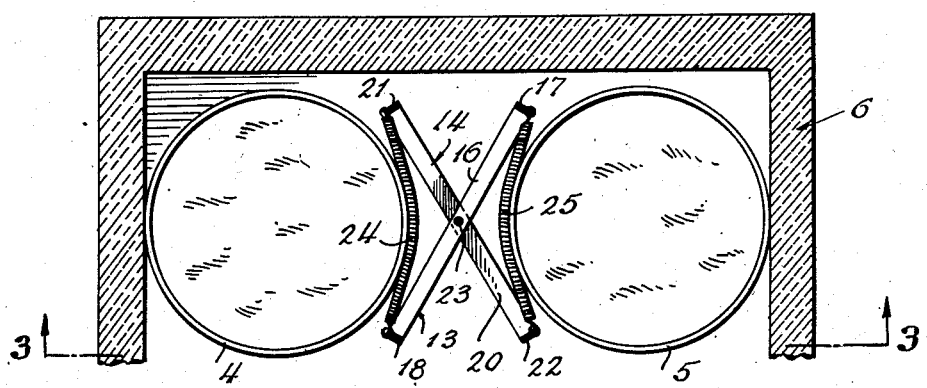
Figure 2 illustrates the arrangement of the container holder between two containers and is a horizontal section along the line 2—2 of Figure 3.
Figure 3:
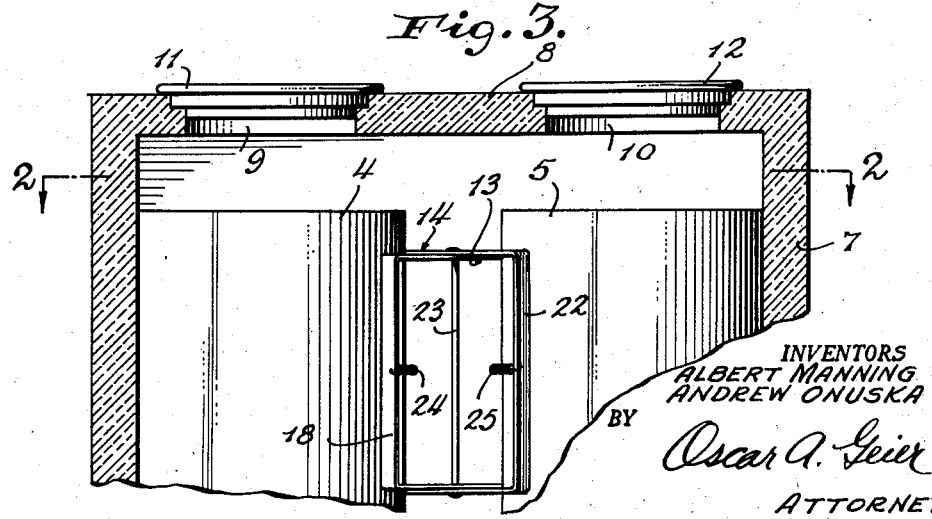
Figure 3 is a vertical section along the line 3—3 of Figure 2.

The arrangement and the operation of the illustrated container holder are shown in Figures 2 and 3. The user moves the frames of the container holder toward each other in such a manner that the vertical element 21 is moved toward the element 17, and the element 18 is moved toward the element 22. Then the springs 24 and 25 are extended while the holder is sufficiently flattened so that it can be conveniently inserted into the comparatively narrow space between the containers 4 and 5 (Fig. 2). When the user releases the frames, the springs 24 will tend to move the element 21 toward the element 18, while the spring 25 will try to bring the elements 17 and 22 closer together. At the same time, the spring 24 will embrace a part of the circumference of the container 4, while the spring 25 will similarly engage the container 5. The two springs 24 and 25 will remain in frictional engagement with the walls of the two containers 4 and 5 and will hold the containers in place, so that they will not be rotated or turned while their contents are being removed.

It is apparent that the invention shown above has been given by way of illustration and not by way of limitation, and that the article above described is subject to wide variations and modifications without departing from the scope or intent of the present invention. All of such variations and modifications are to be included within the scope of the present invention.

What is claimed is:

A holder for containers and the like, comprising two like rigid open rectangular frames vertically arranged in pivotal relation, each of said frames having corresponding upper and lower horizontal elements in axially overlapping contacting relation, and a vertical pivot extending through the overlap at the median point of said horizontal elements of the frames, and parallel vertical elements extending between said horizontal elements and connected thereto, and spring elements connecting opposed corresponding vertical elements of the respective frames on opposite sides of the pivot, said spring elements being adapted to frictionally engage said containers and being deformed inwardly thereby, whereby the containers are prevented from rotating.

ALBERT MANNING.
ANDREW ONUSKA.